United States Patent
Zhang et al.

(10) Patent No.: US 7,454,520 B2
(45) Date of Patent: Nov. 18, 2008

(54) METHOD AND APPARATUS FOR GENERATING A ROUTING TABLE

(75) Inventors: Zheng Zhang, San Jose, CA (US); Zhichen Xu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 10/299,908

(22) Filed: Nov. 20, 2002

(65) Prior Publication Data
US 2004/0098503 A1 May 20, 2004

(51) Int. Cl.
*G06F 15/173* (2006.01)
(52) U.S. Cl. .................................... 709/238
(58) Field of Classification Search ............ 709/238, 709/242–243, 245
See application file for complete search history.

(56) References Cited

U.S. PATENT DOCUMENTS

| | | | | |
|---|---|---|---|---|
| 5,241,682 A * | 8/1993 | Bryant et al. | ........ | 709/249 |
| 6,304,556 B1 * | 10/2001 | Haas | ........ | 370/254 |
| 6,611,872 B1 * | 8/2003 | McCanne | ........ | 709/238 |
| 6,654,379 B1 * | 11/2003 | Grover et al. | ........ | 370/406 |
| 6,718,394 B2 * | 4/2004 | Cain | ........ | 709/242 |
| 6,980,524 B1 * | 12/2005 | Lu et al. | ........ | 370/254 |
| 7,020,464 B2 * | 3/2006 | Bahl et al. | ........ | 455/432.1 |
| 2004/0109407 A1 * | 6/2004 | Grover et al. | ........ | 370/218 |
| 2006/0164976 A1 * | 7/2006 | Grover et al. | ........ | 370/228 |

OTHER PUBLICATIONS

Joa-Ng, et al. "A peer-to-peer zone-based two-level link state routing for mobile ad hoc networks", Aug. 1999, IEEE, IEEE Journal on Selected Areas in Communications, vol. 17, Issue 8, pp. 1415-1425.*
Iwata, et al. "Scalable routing strategies for ad hoc wireless networks", Aug. 1999, IEEE, IEEE Journal on Selected Areas in Communications, vol. 17, Issue 8, pp. 1369-1379.*
Tseng, et al. "Location awareness in ad hoc wireless mobile networks", Jun. 2001, IEEE, Computer vol. 34, Issue 6, pp. 46-52.*
Helmy, "Architectural framework for large-scale multicast in mobile ad hoc networks", 2002, IEEE, IEEE International Conference on Communications, 2002, vol. 4, pp. 2036-2042.*
Hong, et al. "Scalable routing protocols for mobile ad hoc networks", IEEE, IEEE Network, Jul./Aug. 2002, vol. 16, Issue 4, pp. 11-21.*
Nikaein, et al. "DDR-distributed dynamic routing algorithm for mobile ad hoc networks", 2000, IEEE, 2000 First Annual Workshop on Mobile and Ad Hoc Networking and Computing, 2000, pp. 19-27.*

(Continued)

*Primary Examiner*—Bunjob Jaroenchonwanit
*Assistant Examiner*—Julian Chang

(57) ABSTRACT

In a method of generating a routing table for a selected peer, a zone of the selected peer is compared to a target zone. A current entry associated with the zone of the selected peer is created in a routing table of the selected peer in response to the zone of the selected peer being one of smaller and equal to the target zone.

20 Claims, 10 Drawing Sheets

400

| | ROUTING LEVEL | ZONE | NEIGHBORING ZONES | RESIDENTS |
|---|---|---|---|---|
| 425a | $R_0$ | $R_0 Z$ | $(R_0 N_{1L}, R_0 N_{1U})...$ $(R_0 N_{DL}, R_0 N_{DU})$ | A, D, F... |
| 425b | $R_1$ | $R_1 Z$ | $(R_1 N_{1L}, R_1 N_{1U})...$ $(R_1 N_{1L}, R_1 N_{1U})$ | A, D, G |
| | ... | ... | ... | ... |
| 425n | $R_L$ | $R_L Z$ | $(R_1 N_{1L}, R_1 N_{1U})...$ $(R_1 N_{1L}, R_1 N_{1U})$ | A |

OTHER PUBLICATIONS

Pearlman, et al. "Determining the optimal configuration for the zone routing protocol", Aug. 1999, IEEE, IEEE Journal on Selected Areas in Communications, vol. 17, Issue 8, pp. 1395-1414.*

Takahashi, et al. "Multilevel Zone-Based Hierarchical Link State Routing with Location Search Technique Applying Hierarchical Request for Mobile Ad Hoc Networks", 2004, Wiley Periodicals, Inc., Electronic and Communications in Japan, Part 1, vol. 88, No. 1, pp. 44-52.*

Mathy, et al, "Scalable Adaptive Hierarchical Clustering", 2002, IEEE, IEEE Communications Letters, vol. 6, No. 3, pp. 117-119.*

Banerjee, et al, "A Clustering Scheme for Hierarchical Control in Multi-hop Wireless Networks", 2001, IEEE, IEEE INFOCOM 2001, pp. 1028-1037.*

Xu, et al, "Building Low-maintenance Expressways for P2P Systems", 2002 (internal), HP. (cited as background information).*

* cited by examiner

| ROUTING LEVEL | ZONE | NEIGHBORING ZONES | RESIDENTS |
|---|---|---|---|
| $R_0$ | $R_0Z$ | $(R_0N_{1L}, R_0N_{1U})...(R_0N_{DL}, R_0N_{DU})$ | A, D, F... |
| $R_1$ | $R_1Z$ | $(R_1N_{1L}, R_1N_{1U})...$ | A, D, G |
| ... | ... | ... | ... |
| $R_L$ | $R_LZ$ | $(R_1N_{1L}, R_1N_{1U})...(R_1N_{1L}, R_1N_{1U})$ | A |

METHOD AND APPARATUS FOR GENERATING A ROUTING TABLE

CROSS-REFERENCES

The present application is related to pending:

U.S. application Ser. No. 10/231,184, filed on Aug. 30, 2002, and entitled "EXPRESSWAY ROUTING AMONG PEERS",by Xu et al.; and U.S. application Ser. No. 10/237,618, filed on Sep. 10, 2002,and entitled "CREATING EXPRESSWAYS FOR OVERLAY ROUTING" by Zheng et al., which are assigned to the assignee and are incorporated by reference herein in their entirety.

FIELD

This invention relates generally to network systems. More particularly, the invention relates to generating routing tables.

DESCRIPTION OF THE RELATED ART

Peer-to peer (P2P) systems represent a class of networks that utilize distributed resources and perform critical functions in a decentralized manner. Compared with traditional client/server systems, P2P systems have advantages such as improved scalability and reliability, elimination of hot spots surrounding big servers, better resource utilization, lower cost of ownership, etc.

Although P2P may indicate a shift in general purpose computing, the early generation of P2P systems were typically limited to information placement and look-up. One drawback and disadvantage of the earlier P2P systems is they could not guarantee information location for requesting applications. For instance, early P2P systems (e.g., Gnutella and Freenet) searched for a requested object, i.e., requested information, by looking for cached copies via flooding (they typically use heuristics to reduce the number of nodes that have to be flooded). As a result, the search may fail because the cached copies may not exist even when the requested object exists.

Accordingly, later generations of P2P systems dictated a consistent mapping between an object key to a hosting node. In these systems, an object can always be retrieved as long as a hosting node can be reached. The random generation of node identifications and document keys allow even distribution of the data objects among the hosting nodes. Nodes in these later generation P2P systems comprise an overlay network. Since there is a consistent binding between objects to nodes, locating an object is reduced to the problem of routing to the destination node from the requesting node of where the query is submitted.

However, these later generation P2P systems also have disadvantages and drawbacks. As an example, the overlay network of the later generation P2P systems had limited capability to take advantage of the heterogeneity (e.g., storage capacity, packet forward capacity, network capacity, etc.) of their underlying network. More particularly, the overlay network of the later generation P2P systems were typically homogeneously constructed over the underlying network. Typically, the overlay network was constructed with network proximity as a guide. As a result, the physical topology of the overlay network may cause uneven node distribution and lead to hotspots (e.g., topology aware Content Addressable Network (CAN) from Berkeley).

SUMMARY

An embodiment pertains to a method of generating a routing table for a selected peer. The method includes comparing a zone of the selected peer with a target zone and pushing a current entry associated with the zone of the selected peer in the routing table of the selected peer in response to the zone of the selected peer being one of smaller than and equal to the target zone.

Another embodiment relates to an apparatus for generating a routing table for a selected peer. The method includes means for a new node joining a peer-to-peer network, where the selected peer is included in the peer-to-peer network. The apparatus also includes means for comparing a zone of the selected peer with a target zone in response to a new node joining the peer-to-peer network and means for adding an entry to the routing table in response to the zone of the selected peer being one of smaller than and equal to the target zone.

Yet another embodiment pertains to a method of adding entries to routing tables. The method includes joining a peer to a peer-to-peer network in a host zone of a host peer and receiving at least one entry associated with a host routing table of the host peer. The method also includes comparing a zone with a target zone and creating an entry in a routing table in response to said zone being smaller or equal to the target zone.

Yet another embodiment relates to a computer readable storage medium on which is embedded one or more computer programs. The one or more computer programs implements a method of adding entries to a routing table. The one or more computer programs include a set of instructions for joining a peer to a peer-to-peer network in a host zone of a host peer and receiving at least one entry associated with a host routing table of the host peer. The set of instructions also includes comparing a zone with a target zone and creating an entry in a routing table in response to the zone being smaller or equal to the target zone.

Yet another embodiment relates to a system. The system includes a plurality of peers configured to operate as a peer-to-peer network and a plurality of routing modules, each routing module associated with a respective peer of the plurality of peers and configured to implement an expressway overlay network over the peer-to-peer network. The system also includes a plurality of routing tables, each routing table associated with a respective routing module. Each routing module is configured to forward a routing table of the respective peer excluding a current entry in response to a new peer being added to a zone of the respective peer and to compare a zone associated with a current table entry of the respective peer with a target zone in response to the new peer being added. The routing module is also configured to create a new entry in the routing table of the respective peer in response to the zone being smaller or equal to the target zone.

Yet another embodiment pertains to a system for generating routing tables in a peer. The system includes at least one processor, a memory coupled to the at least one processor, a routing table stored in the memory, and a routing module associated with the routing table and configured to be executed by the at least one processor. The routing module is configured to compare a zone of the peer with a target zone in response to a new peer being added to a peer-to-peer network and to create an entry in the routing table in response to the zone of the peer being one of smaller than and equal to the target zone.

BRIEF DESCRIPTION OF THE DRAWINGS

Various features of the embodiments can be more fully appreciated as the same become better understood with reference to the following detailed description of the embodiments when considered in connection with the accompanying figures, in which:

FIG. 4 illustrates a routing table shown in FIG. 3 in accordance with yet another embodiment;

DETAILED DESCRIPTION OF EMBODIMENTS

Figure 1:
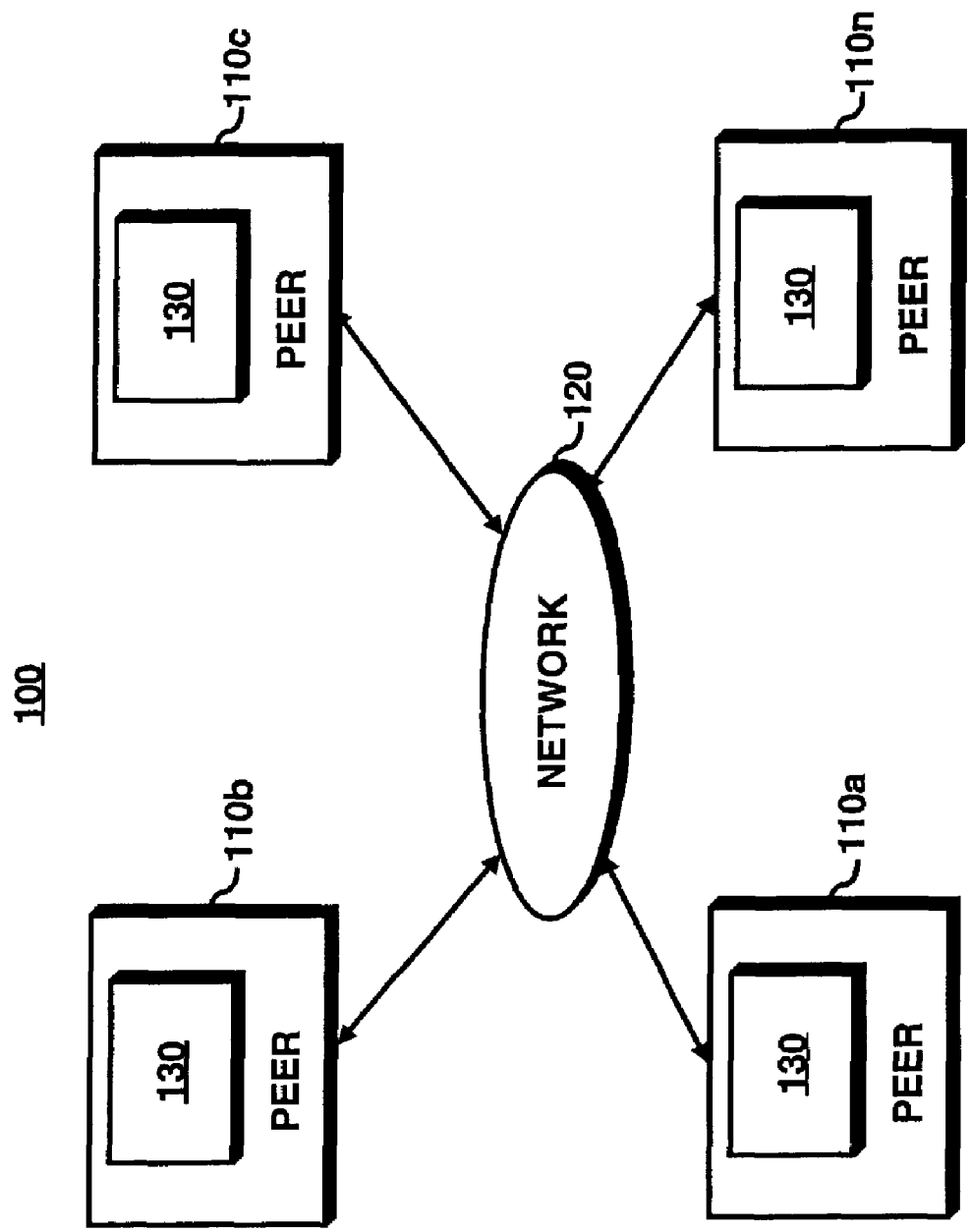
FIG. 1 illustrates an exemplary system where an embodiment may be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment, a peer in a peer-to-peer (P2P) network may be configured to route data utilizing expressway routing. More particularly, an expressway overlay network may be implemented over the existing P2P system. The expressway overlay network may provide a mechanism to find the largest span, i.e., smallest number of hops, between a source peer and a destination peer. The expressway overlay network may be configured to divide the entire space (e.g., a Cartesian space for a CAN system) of the existing P2P system into zones. The largest zone may encompass the entire space of the existing P2P system. Succeeding layers divide the existing P2P system into smaller zones. Each peer may belong to multiple zones within the respective layers and each zone may have more than one zone representative. However, at the highest layer (e.g., the $L^{th}$ layer, where L may indicate the depth of the zones), each peer may be a member of a base zone (i.e., the basic or discrete unit of the P2P system). The peer may determine the two largest non-overlapping zones between the peer and the destination. An expressway route is formed between the respective zone representatives of the two zones. Accordingly, a substantially direct route, i.e., an expressway, may be formed in order to route data thereby increasing network throughput and reducing the occurrence of hotspots in the underlying network.

In another embodiment, a peer may be configured to generate a routing table to implement expressway routing. More specifically, each peer in the peer-to-peer network to implement the expressway overlay network may execute an expressway routing module. The expressway routing module may be further configured to implement an evolving snapshot algorithm to create and/or maintain the routing table of its respective peer (or node).

In an embodiment of the evolving snapshot algorithm, the expressway routing module may compare the zone, $R_L Z$, associated with a current entry in a routing table of the selected peer with a target zone. In one embodiment, the target zone may be described as $R_{L-1} Z/K$, where $R_L Z$ indicates the zone of the selected peer; L indicates the number of expressways the selected peer is aware of, i.e., the number of routing levels; and K indicates a span of the expressway. Thus, the zone, $R_L Z$, may be compared with zone of a previous routing table entry, $R_{L-1} Z$, where the zone of the previous routing table entry is normalized by the span of the expressways. K.

If the current zone is smaller than or equal to the target zone, the expressway routing module of the selected peer may take a 'snapshot' or copy the current table entry of the routing table of the selected peer. The current routing table entry may contain the current zone, the set of neighboring zones to the current zone and the addresses of one or more residents for each of the neighboring zones. The snapshot may then be added or pushed onto the routing table for the selected peer.

Subsequently, the expressway routing module may increment the routing level, L, and associate the new value of the routing level, L, with the current table entry. The expressway routing module may then determine new neighboring zones and residents therein to complete the current table entry. Accordingly, a routing table may be generated for a selected peer as the peer-to-peer network grows.

In another embodiment, the expressway routing module may be configured to account for new peers joining the P2P network. When a new peer joins the P2P network, the new peer selects an existing (or host) zone to enter. The existing zone has a current (or host) peer. The expressway routing module of the current peer may determine the zone for the host peer as modified by the entering new peer as well as the new neighboring zones. Subsequently, the expressway routing module of the current peer may update the current table entry with the updated information. The expressway routing module of the current peer may also determine the zone, i.e., the dimensions thereof, for the new peer as well as the neighboring zones. The expressway routing module may forward the zone, the set of neighboring zones, and all entries in the routing table of the current peer except for the current routing table entry to the routing module of the new peer, i.e., the new peer inherits from the current peer. The expressway routing module of the new peer uses the inherited routing table in its routing table. Afterwards, the new peer and current peer determines iterates through an embodiment of the evolving snapshot algorithm as described previously and in greater detail below.

FIG. 1 illustrates an exemplary block diagram of a system 100 where an embodiment may be practiced. It should be readily apparent to those of ordinary skill in the art that the system 100 depicted in FIG. 1 represents a generalized schematic illustration and that other components may be added or existing components may be removed or modified.

As shown in FIG. 1, the system 100 includes a plurality of peers 110a . . . 110n. The peers 110a . . . 110n may be configured to exchange information among themselves and with other network nodes over a network 120. The peers 110a ... 110n may be computing platforms (e.g., personal digital assistants, laptop computers, workstations, and other similar devices) that have a network interface. The peers 110a ... 110n may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 120 may be configured to provide a communication channel among the peers 110a ... 110n. The network 120 may be implemented as a local area network, wide area network or combination thereof. The network 120 may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

According to an embodiment, each peer of the peers 110a ... 110b may comprise an expressway routing module 130. The expressway routing module 130 may implement an expressway overlay network for routing data over the existing P2P network, e.g., content addressable network (CAN), CHORD, etc. The expressway overlay network may be configured to divide the entire abstract space of the existing P2P system into zones, which is illustrated in FIG. 2.

Figure 2:
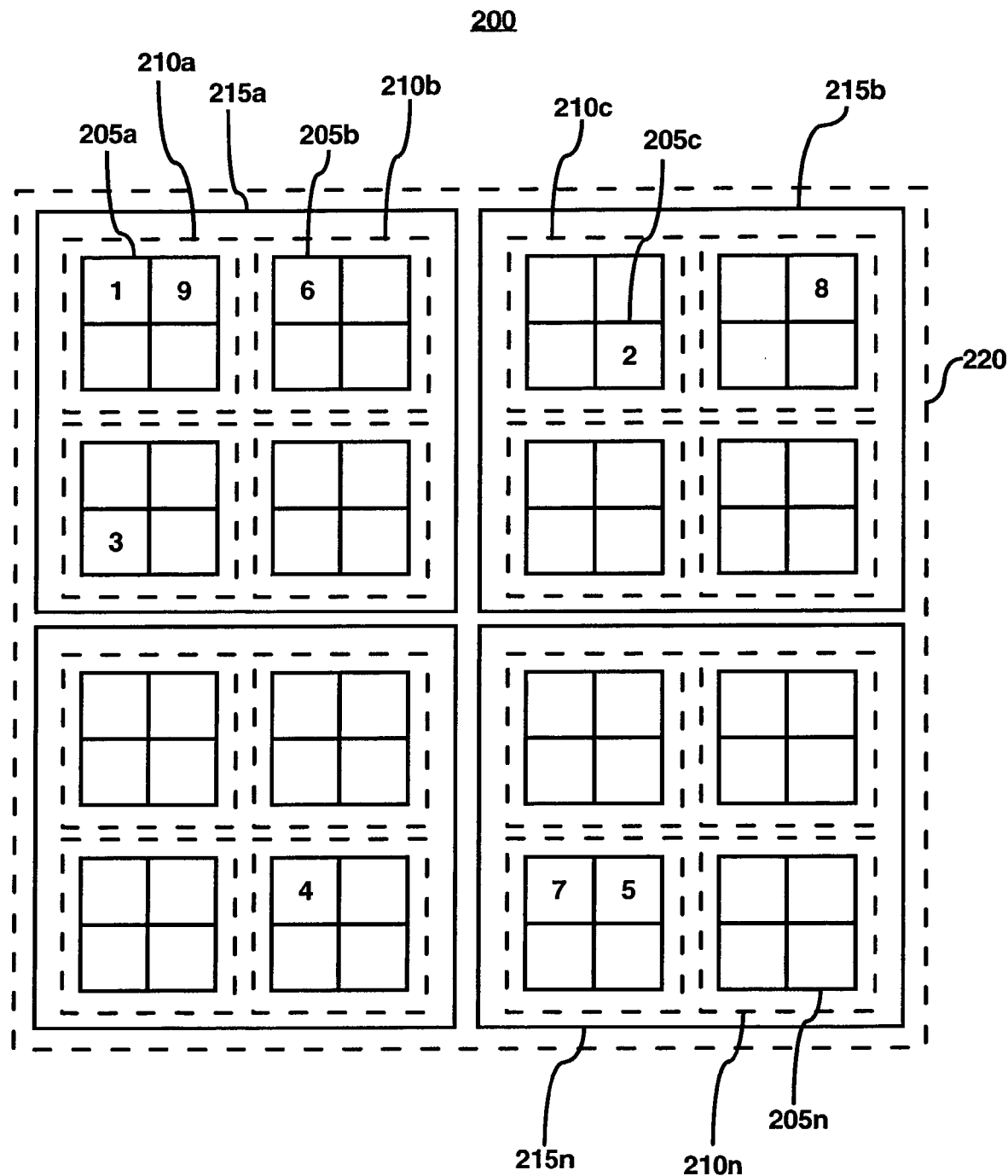
FIG. 2 illustrates an expressway overlay network according to an embodiment.

FIG. 2 illustrates an expressway overlay network 200 according to an embodiment. It should be readily apparent to those of ordinary skill in the art that the expressway overlay network 200 depicted in FIG. 2 represents a generalized abstraction and that other versions or configurations may be implemented.

As shown in FIG. 2, base zones 205a ... 205n may be the core unit of the underlying P2P network zone. For example, if the existing P2P network is a CAN network, the base zone is a CAN zone. In each base zone 205a ... 205n, a zone representative may be appointed. The zone representative may be considered the owner of the zone and becomes the routing point for data routed to the therein. For example, in zone 205a, peer 1 is the zone representative.

In another embodiment, the underlying network may be a Tapestry network. The prefix of the node identification (ID) may be considered a zone that encompasses the respective peer. The smaller the number of bits in the node ID, the larger the zone. Similarly, in yet another embodiment, the underlying network may be a Pastry network. The suffix of the node ID may be considered a zone that encompasses the peer. The smaller the number of bits in the node ID, the larger the zone. The difference between a CAN zone and a Tapestry zone is that the Tapestry zone is no longer Cartesian space. Rather, it is a set of possible node IDs. Note, in a CAN network, the node IDs are pointers and a Cartesian space is a set of pointers.

As part of the expressway overlay network 200, larger zones may be formed from smaller zones. For example, intermediate zones 210a ... 210b may be formed from the base zones 205a ... 205n. Intermediate zones 215a ... 215n may be formed from intermediate zones 210a ... 210n. The largest zone 220, the entire space of the P2P network, is formed from intermediate zones 215a ... 215n.

As with the base zone 205a ... 205n, the intermediates zones 210a ... 210n, 215a ... 215n, may elect (or appoint, select, etc.) one or more zone representatives for each zone. For example, peers 1, 3, and 6, individually and in combination, may become a representative for zone 210a. For example, peer 1 is the zone representative of base zone 205a as well as members of intermediate zones 210a and 215a. As another example, peer 6 may be zone representative for base zone 205b as well as members of intermediate zones 210b and 215b. Similarly, peer 2 can represent zone 205c and 215b.

In accordance with an embodiment, each zone, from base zone to largest zone, may be associated with a routing level (or span), L. The highest value of the routing level, L, may indicate the depth of the expressway overlay network 200. For example, expressway overlay network 200 (see FIG. 2) may have L=3 which is associated with the base zone 205a ... 205n; L=2 associated with intermediate zones 210a.210n; L=1 associated with intermediate zones 215a ... 215n; and L=0 for the largest zone 220. Thus, indicating a depth of four (4).

Returning to FIG. 1, the expressway routing module 130 may also be configured to form expressways between a source peer and a destination to route data according to another embodiment. For example, if peer 1 is to forward data to peer 2, peer 1 may determine that the largest zone that does not encompass the peer 2 is intermediate zone 215a (see FIG. 2). Subsequently, peer 1 forms a communication channel, e.g., a TCP/IP connection to the zone representative (e.g., peer 2) of intermediate zone 215b, in FIG. 2, which is peer 2. Accordingly, data is routed in a substantially efficient manner by bypassing as many intermediate peers as possible between peer 1 and peer 2.

In another embodiment, a source peer may route data by expressways to an intermediate peer. More particularly, a source peer may select the largest neighboring zone based on the closest distance of the neighboring zone to the destination peer. For example, if peer 1 is requested to forward data to peer 7 (shown in FIG. 2), peer 1 may determine that the largest zone that does not encompass peer 7 is again 215a. Accordingly, peer 1 forms a communication channel to the zone representative, peer 2, of the largest neighboring zone 215b. Subsequently, peer 2 may search for the largest zone that does not encompass the destination to forward the data. Thus, each intermediate peer searches its routing table to find an expressway route to the destination peer.

In another embodiment, a selected peer may generate its routing table in response to a new peer joining the peer-to-peer network. More specifically, the selected peer may compare the zone of the current table entry, i.e., $R_L Z$, with a target zone, e.g., $R_{L-1} Z/K$ in response to a new peer joining the peer-to-peer network. If the zone is smaller or equal to the target zone, the peer may create a new version of the current table entry. The peer may push the current table entry down in the routing table and increment the routing level. The new value of the routing value is associated as the current table entry. In effect, the largest value of the routing level becomes the current table entry for the routing table. Subsequently, the peer may determine a new zone and associated the new zone with the current table entry. The peer may also determine neighboring zones and one or more residents therein. The neighboring zones and one or more residents are then associated with the current table entry.

Figure 3:
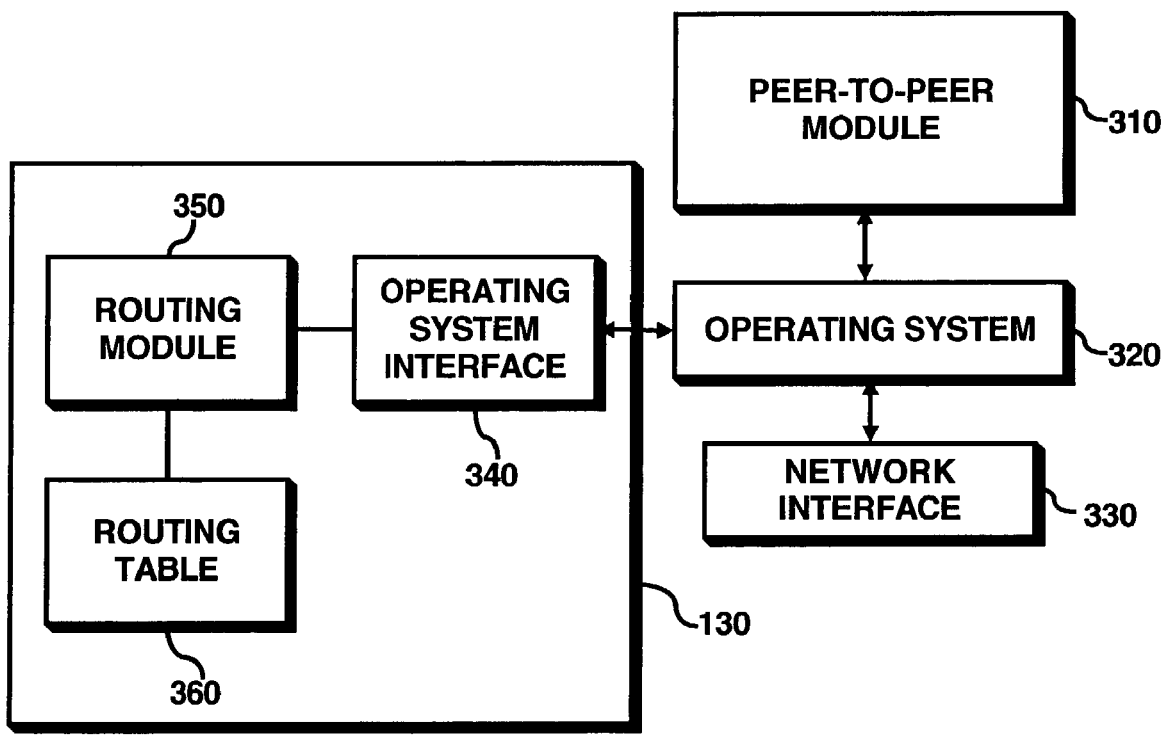
FIG. 3 illustrates an exemplary architecture for an expressway routing module shown in FIG. 1 according to another embodiment.

FIG. 3 illustrates an exemplary architecture 300 for the expressway routing module 130 shown in FIG. 1 in accordance with an embodiment. It should be readily apparent to those of ordinary skill in the art that the architecture 300 depicted in FIG. 3 represents a generalized schematic illustration and that other components may be added or existing components may be removed or modified. Moreover, the architecture 300 may be implemented using software components, hardware components, or a combination thereof.

As shown in FIG. 3, the architecture 300 may include a peer-to-peer module, an operating system 320, the expressway routing module 130, and a network interface 330. The peer-to-peer module 310 may be configured to provide the capability to a user of a peer to share information with another peer, i.e., each peer may initiate a communication session with another peer. The peer-to-peer module 310 may be a commercial off-the-shelf application program, a customized software application or other similar computer program. Such programs such as KAZAA, NAPSTER, MORPHEUS, or other similar P2P applications may implement the peer-to-peer module 310.

The expressway routing module 130 may be configured to monitor an interface between the peer-to-peer module 310 and the operating system 320 through an operating system interface 340. The operating system interface 340 may be implemented as an application program interface, a function call or other similar interfacing technique.

The expressway routing module 130 may include a routing module 350 and a routing table 360. The routing module 350 may be configured to implement the expressway overlay network and the expressway routing. More particularly, the routing module 350 may create an overlay network described with respect to FIG. 2, by implementing routing tables as shown in FIG. 4.

FIG. 4 illustrates routing table 360 as shown in FIG. 3 in accordance with an embodiment. It should be readily apparent to those of ordinary skill in the art that the routing table 360 depicted in FIG. 4 represents a generalized illustration and that other fields may be added or existing fields may be removed or modified.

As shown in FIG. 4, the routing table 360 may include a routing level field 405, a zone field 410, a neighboring zones field 415, and a resident field 420. In one embodiment, the values in the routing level field 405, the zone field 410, the neighboring zones 415, and the resident field 420 are associated or linked together in each entry of the entries 425a . . . 425n.

A value in the routing level field 405 may indicate the span the between zone representatives. The range of values for the level of the zone may range from the basic unit of the P2P system ($R_L$) to the entire space of the P2P system ($R_0$). The largest value in the routing level field 405 may indicate the depth of the routing table as well as being the current table entry.

A value in the zone field 410 may indicate which zones the associated peer is aware thereof. At the $R_0$ level for peer 1, the zone would be in the entire space of the existing P2P network. For example, with reference to FIG. 2, the entire space of the P2P system is a Cartesian space of two dimensions (x, y). The zone may be indicated by a designation of (0 . . . 1) in the x-direction and (0 . . . 1) in the y-direction. At the $R_L$ level for peer 1, the zone may be indicated by a designation of (0 . . . 0.125) in the x-direction and (0.875 . . . 1).

Values in the neighboring zones field 415 indicate the identified neighbor zones to the peer. A neighbor zone may be determined by whether a zone shares a common border in the coordinate space; i.e., in a d-dimensional coordinate space, two nodes are neighbors if their coordinate spans overlap along d-1 dimensions and abut along one dimension. Continuing on with the above example, at the $R_0$ level for peer 1, the neighboring zones may be designated as lower neighbor zone: (0 . . . 1)(0 . . . 1) with zone representative as peer 1 and upper neighbor zone (0 . . . 1)(0 . . . 1) with zone representative as peer 1 in the x-direction. The neighboring zones in the y-direction may be designated as lower neighbor zone (0 . . . 1)(0 . . . 1) with zone representative as peer 1 and upper neighbor zone (0 . . . 1)(0 . . . 1) with zone representative as peer 1. Similarly, for peer 1's zone at level L, its lower neighbor along x-direction is the zone (0.875 . . . 1) (0.875 . . . 1) with peer 8 as the representative, whereas it upper neighbor is the zone (0.125 . . . 0.25)(0.875 . . . 1.0) with peer 9 as representative. It should be noted that only representative for neighbor zones at level L need to be kept as hard state (i.e., unmodified), the representatives for neighbor zones at a lower-level are soft states that can be modified on-the-fly to adapt to changing network conditions. In one embodiment, the representatives of a neighbor zone are selected based on closest distance (e.g., number of hops) to the current peer.

Values in the resident fields 420 may indicate the identities of one or more residents for the neighboring zones stored in the neighboring zones field 415. The values in residents field 420 may be indexed to the values the neighboring zones field 415 to associate the appropriate resident in the proper neighboring zone.

Returning to FIG. 3, the routing module 350 may be implemented as a software program, a utility, a subroutine, or other similar programming entity. In this respect, the routing module 350 may be implemented using software languages such as C, C++, JAVA, etc. Alternatively, the routing module 350 may be implemented as an electronic device utilizing an application specific integrated circuit, discrete components, solid-state components or combination thereof.

The operating system 320 may be configured to manage the software applications, data and respective hardware components (e.g., displays, disk drives, etc.) of a peer. The operating system 320 may be implemented by the MICROSOFT WINDOWS family of operating systems, UNIX, HEWLETT-PACKARD HP-UX, LINUX, RIM OS, and other similar operating systems.

The operating system 320 may be further configured to couple with the network interface 330 through a device driver (not shown). The network interface 330 may be configured to provide a communication port for the respective peer over the network 120 (shown in FIG. 1). The network interface 330 may be implemented using a network interface card, a wireless interface card or other similar input/output device.

Figure 5:
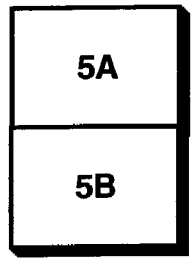
FIG. 5 is a key to FIGS. 5A-B.
Figure 5A:
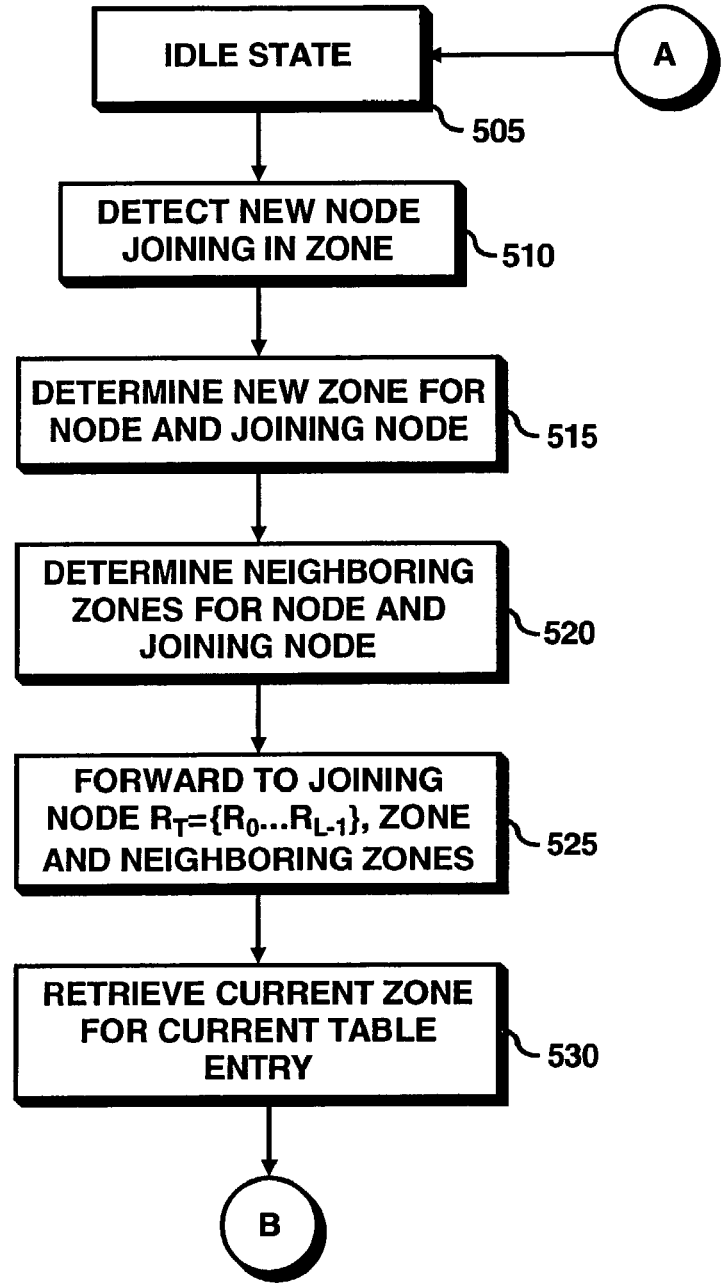
FIGS. 5A-B collectively illustrate an exemplary flow diagram according to yet another embodiment.
Figure 5B:
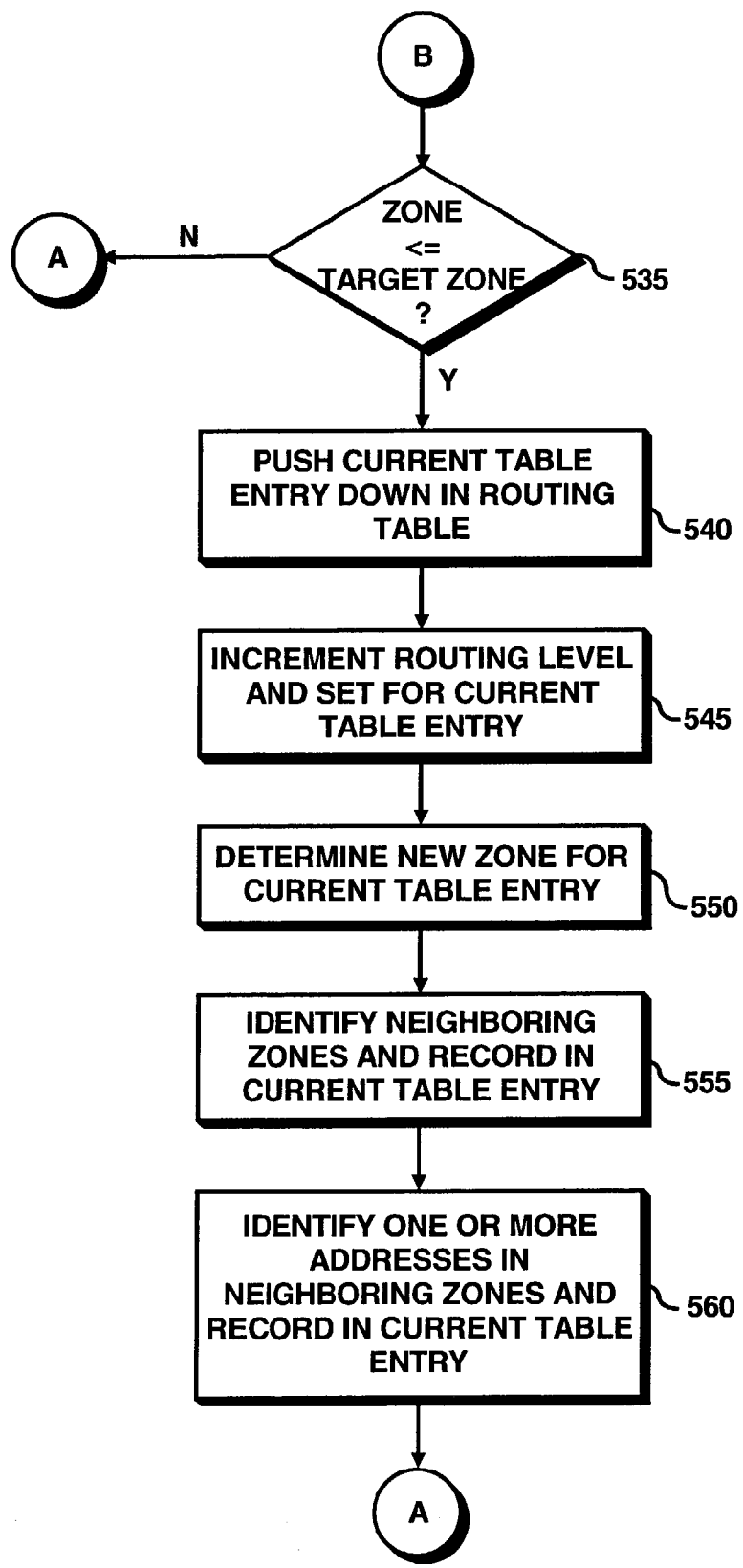

FIGS. 5A-B collectively illustrate an exemplary flow diagram 500 of generating a routing table for use in expressway routing shown in FIGS. 1 and 3 in accordance with another embodiment. It should be readily apparent to those of ordinary skill in the art that this method 500 represents a generalized illustration and that other steps may be added or existing steps may be removed or modified.

Referring to FIG. 5A, the routing module 350 of a host node may be in an idle state, in step 505. The routing module may detect a new node (or peer) joining the peer-to-peer network in the current zone of the host node, in step 510. This check may be performed on a periodic basis or may be event-driven.

In step 515, the routing module 350 may be configured to determine a latest dimension of the current zone for the host node and the zone for the joining node. When a new node joins the expressway overlay network (e.g., 200), the new node joins in an existing node (i.e., the host node). Accordingly, the current zone of the host node is determined as well as the current zone for the joining node by the routing module of the 350 utilizing the mechanisms of the underlying peer-to-peer network (e.g., a CAN network, a CHORD, etc.).

In step 520, the routing module 350 may be configured to determine the neighboring zones for the host and joining nodes by utilizing the mechanisms of the underlying peer-to-peer network. The routing module 350 may also update the current table entry, $R_L$, (e.g. 420n shown in FIG. 4) of the routing table 360 of the host node with the new zone and new neighboring zones.

In step 525, the routing module 350 of the host node may be configured to forward to the joining node the routing table excluding the current table entry, i.e., $R_T=\{R_0 \ldots R_{L-1}\}$, the zone of the joining node and the neighboring zones (as well as representatives for each of the said neighbor zones) for the zone.

In step 530, the routing module 350 may retrieve the zone, $R_L Z$, from the current table entry for the selected peer, in step 525.

Referring to FIG. 5B, in step 535, the routing module 350 may compare the zone of the current table entry, $R_L Z$, of the selected peer with a target zone. In an embodiment, the target zone may be chosen as the zone from a previous routing table entry divided by the span of the expressway, e.g., $(R_{L-1}Z)/K$, where K can be user-specified. In other embodiments, the target zone may be user-specified or selected based on network parameters.

If the zone of the current table entry, $R_L Z$, is greater than the target zone, e.g., $(R_{L-1}Z)/K$, the routing module 350 may return to the idle state of step 505 (shown in FIG. 5A). Otherwise, if the zone of the current table entry, RLZ, is smaller or equal to the target zone, the routing module 350 may push the current table entry to the routing table 360, i.e., create a new current table entry, in step 540.

In step 545, the routing module 350 may increment the value of the routing level, L=L+1. The routing module 350 may then associate the new value of the routing level as the latest version of the current table entry (e.g., entry 420n in FIG. 4), i.e., growing the routing table 360.

In step 550, the routing module 350 may be configured to determine a new zone. The determined zone may then be associated with the current routing table entry, $R_L$. In step 550, the routing module 350 may identifying neighboring zones and associated the neighboring zone with the current routing table entry, $R_L$. In step 555, the routing module 350 may be configured to identify one or more addresses in each of the neighboring zones as residents therein. The one or more addresses may then be associated with the current table entry, $R_L$. Subsequently, the routing module 350 may be configured to return to the idle state of 505 (shown in FIG. 5A).

Figure 6A:
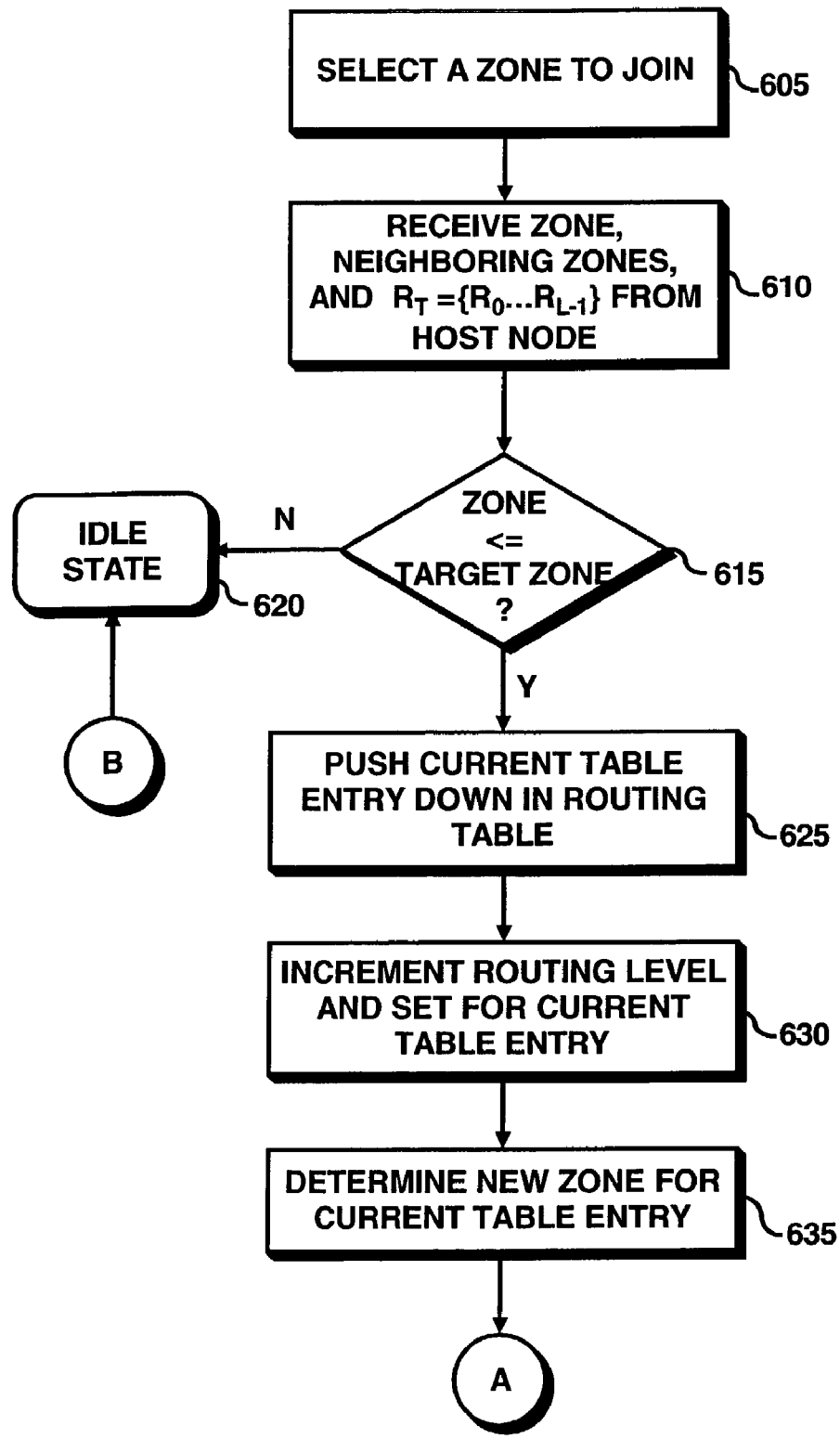
FIGS. 6A-B collectively illustrate an exemplary flow diagram according to yet another embodiment.
Figure 6B:
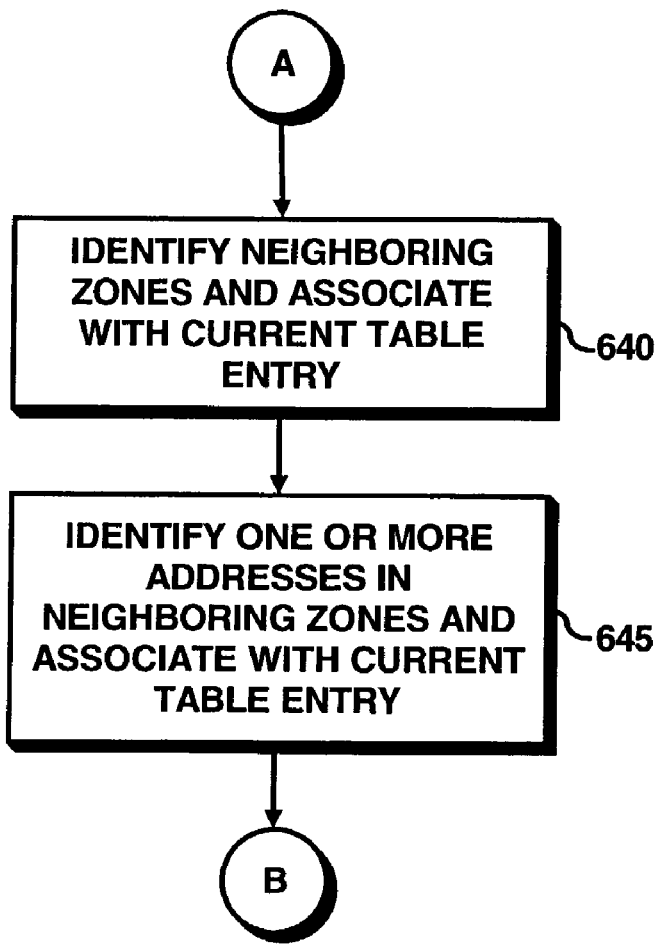
Figure 6:
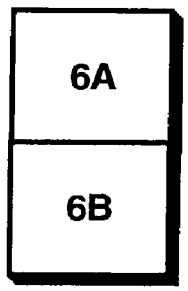
FIG. 6 is a key to FIGS. 6A-B.

FIGS. 6A-B collectively illustrate an exemplary flow diagram 600 for the expressway routing module 130 and routing module 350 shown in FIGS. 1 and 3 with respect to a new node joining the peer-to-peer network in accordance with another embodiment. It should be readily apparent to those of ordinary skill in the art that this flow diagram 600 represents a generalized illustration and that other steps may be added or existing steps may be removed or modified.

As shown in FIG. 6A, a node (or peer) may elect to join the peer-to-peer network that implements the expressway overlay network. The routing module 350 of the peer may elect to join the peer-to-peer network in a zone of a selected peer or host node, in step 605. The selection of the zone may be done deterministically, randomly or by some other heuristic.

After selecting a candidate zone, the routing module 350 may receive the dimensions of the candidate zone, neighboring zones to the candidate zone, and a routing table of the selected peer except for the current table entry, $R_L$, of the selected peer, i.e., $R_T=\{R_0 \ldots R_{L-1}\}$. The routing module 350 of the joining node may incorporate $R_T$ as its respective routing table 360 and associate the zone and neighboring zones with its respective current table entry, $R_L$.

In step 615, the routing module 350 of the joining node may compare the zone of the current table entry, $R_L Z$, of the selected peer with a target zone. In an embodiment, the target zone may be chosen as the zone from a previous routing table entry divided by the span of the expressway, e.g., $(R_{L-1}Z)/K$, where K can be user-specified. In other embodiments, the target zone may be user-specified or selected based on network parameters.

If the zone of the current table entry, $R_L Z$, is greater than the target zone, e.g., $(R_{L-1}Z)/K$, the routing module 350 may enter an idle state, in step 620. Otherwise, if the zone of the current table entry, $R_L Z$, is smaller or equal to the target zone, the routing module 350 of the joining node may push the current table entry to the routing table 360, i.e., create a new current table entry, $R_L$, in step 625.

In step 630, the routing module 350 may increment the value of the routing level, i.e., L=L+1. The routing module 350 may also associated the incremented value of the routing level as the 'new' current table entry, $R_L$.

In step 635, the routing module 350 of the joining node may be configured to determine a new zone for the current table entry, $R_L$ utilizing the mechanisms of the underlying peer-to-peer network (e.g., CAN network, CHORD, etc.).

Referring to FIG. 6B, in step 640, the routing module 350 of the joining node may identify neighboring zones and associate the neighboring zone with the current routing table entry, $R_L$. In step 645, the routing module 350 may be configured to identify one or more addresses in each of the neighboring zones as residents therein. The one or more addresses may then be associated with the current table entry, $R_L$.

Figure 7:
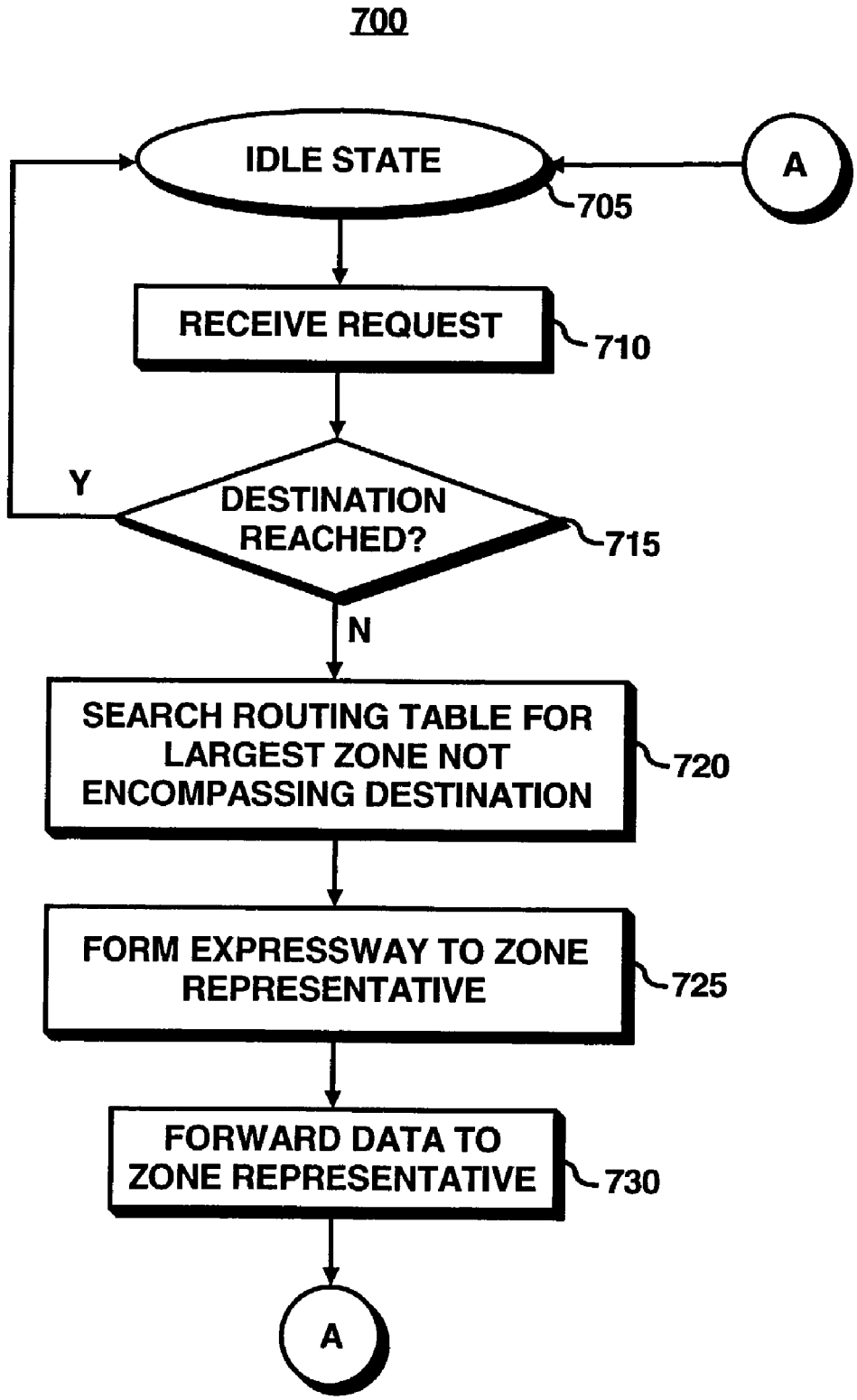
FIG. 7 collectively illustrate an exemplary flow diagram according to yet another embodiment.

FIG. 7 illustrates an exemplary flow diagram for a method 700 of the expressway routing module 130 and routing module 350 shown in FIGS. 1 and 3 in accordance with another embodiment. It should be readily apparent to those of ordinary skill in the art that this method 700 represents a generalized illustration and that other steps may be added or existing steps may be removed or modified.

As shown in FIG. 7, the routing module 350 of the expressway routing module 130 may be configured to be in an idle state in step 705. The routing module 350 may monitor the network interface 330 via the operating system 320 (shown in FIG. 3) for any received requests to route data. The requests may be initiated by a user of a peer or the requests may be forwarded to the receiving peer functioning as an intermediate peer.

In step 710, the routing module 350 may detect a message (or request) received through the network interface 330. The routing module 350 may be configured to temporarily store the message for processing.

In step 715, the routing module 350 determines whether the message has reached its destination. More particularly, the routing module 350 may check the destination address of the message to determine whether the receiving peer is the destination for the message. If the destination is the receiving peer, the routing module 350 may return to the idle state of step 705.

Otherwise, in step 720, the routing module 350 may be configured to search the routing table 350 for a largest zone not encompassing the destination. It should be noted that the largest zone that does not encompass the destination can always be found, given the way the zones are determined as described above.

In step 725, the routing module 350 may be configured to form a communication channel, i.e., an expressway, to the zone representative of the destination zone at the level of the largest zone. The routing module 350 may forward the requested data to the zone representative in the destination zone in step 730. The zone representative will then forward the data to the destination peer. Subsequently, the routing module 350 may return to the idle state of step 705.

Figure 8:
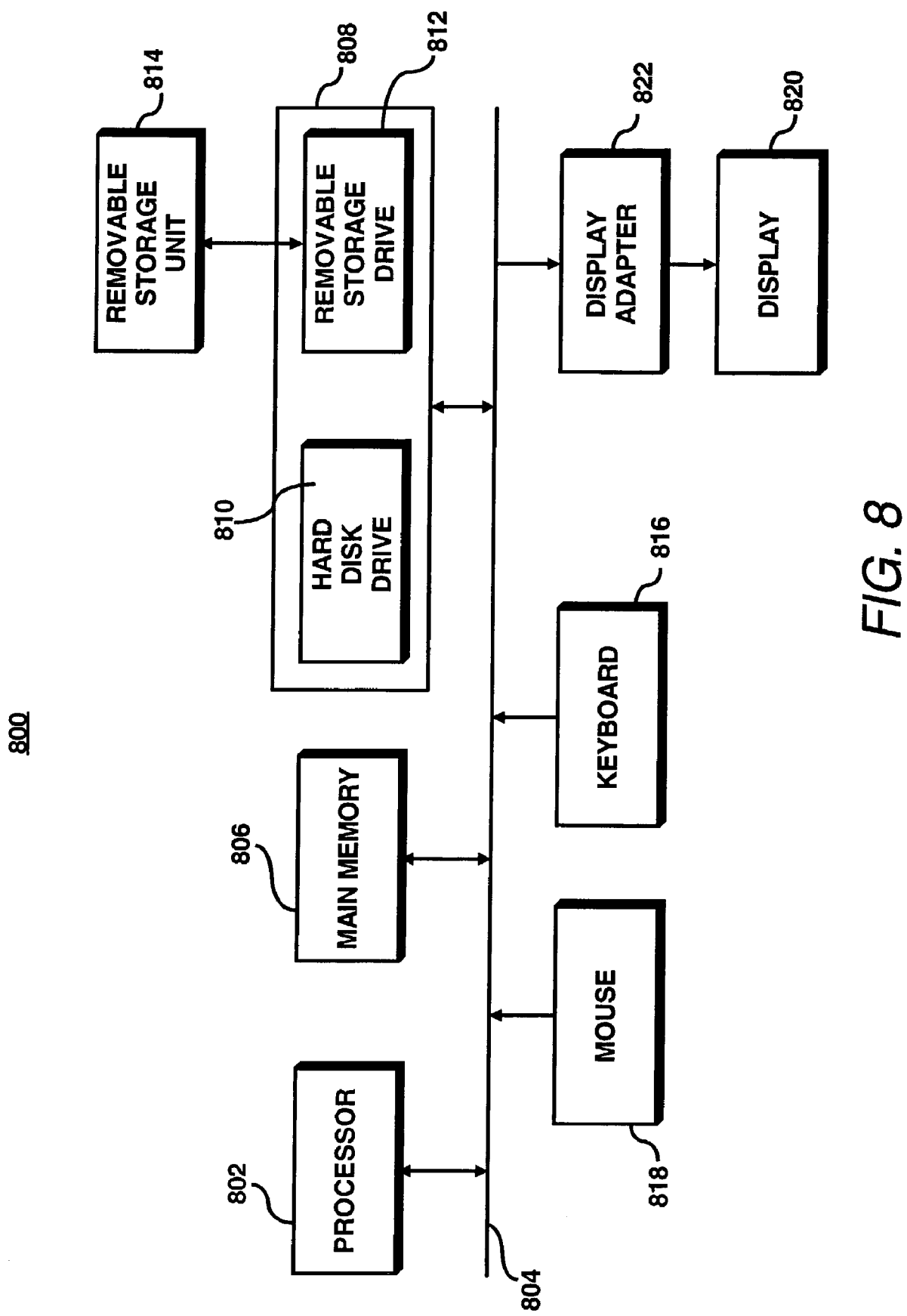
FIG. 8 illustrates an exemplary flow diagram according to yet another embodiment.

FIG. 8 illustrates an exemplary block diagram of a computer system 800 where an embodiment may be practiced. The functions of the expressway routing module may be implemented in program code and executed by the computer system 800. The expressway routing module may be implemented in computer languages such as PASCAL, C, C++, JAVA, etc.

As shown in FIG. 8, the computer system 800 includes one or more processors, such as processor 802, that provide an execution platform for embodiments of the expressway routing module. Commands and data from the processor 802 are communicated over a communication bus 804. The computer system 800 also includes a main memory 806, such as a Random Access Memory (RAM), where the software for the expressway routing module may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the expressway routing module may be stored. The removable storage drive 812 reads from and/or writes to a removable storage unit 814 in a well-known manner. A user interfaces with the expressway routing module with a keyboard 816, a mouse 818, and a display 820. The display adaptor 822 interfaces with the communication bus 804 and the display 820 and receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executabic code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory). EPROM (erasable, programmable ROM), EEPROM (electrically erasable, programmable ROM). and magnetic or optical disks or tapes. exemplary computer readable signals, whether modulated using a carrier or not are signals that a computer system hosting or running the present invention can be configured to access, including signals downloaded through the Internet or other networks. Concrete examples of the foregoing include distribution of executable software program(s) of the computer program on a CD-ROM or via internet download. In a sense, the Internet itself, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of generating a new routing table for a new peer in a peer-to-peer (P2P) network, the P2P network includes a plurality of zones, wherein each zone is represented by a peer of the P2P network, comprising:
   detecting said new peer joining in a zone of a host peer in the P2P network;
   determining a current zone of said new peer and a current zone of the host peer;
   forwarding a routing table of the host peer to said new peer and entries in the routing table are organized in a hierarchy of levels, wherein the forwarded routing table excludes a current table entry of the host peer;
   setting the new routing table for said new peer as the forwarded routing table of the host peer and an addition of a current table entry in the new routing table, the current table entry in the new routing table is based on the determined current zone of said new peer;
   comparing the current zone of said new peer with a target zone, the target zone is chosen as a first zone divided by an expressway span K, wherein the first zone is identified from a routing table entry one routing level immediately above a routing level of the current table entry in the hierarchy of the routing table of the host peer, and the expressway span K is a span between zone representatives of zones in the one routing level immediately above the routing level of the current table entry in the hierarchy of the routing table of the host peer;
   responsive to the comparing that indicates the current zone of said new peer being one of smaller than and equal to said target zone,
      moving the current table entry down in the new routing table down one routing level to make room for a new current table entry for said new peer,
      determining a new current zone for said new peer and associating the new current routing table entry with the new current zone for said new peer.

2. The method according to claim 1, further comprising: maintaining a plurality of entries in the new routing table of said new peer, each entry comprising:
   a zone;
   a routing level of said zone;
   a plurality of neighboring zones; and
   one or more addresses at residents in each neighboring zone of said plurality of zones.

3. The method according to claim 2, further comprising: determining a plurality of neighboring zones of said zone; and determining one or more residents in said plurality of neighboring zones.

4. The method according to claim 3, further comprising: associating said plurality of neighboring zones and said one or more residents with said current entry.

5. The method according to claim 3, wherein said determination of said one or more residents further comprises:
   determining respective addresses of said one or more residents.

6. A method of adding entries to a selected routing table and entries in the selected routing table are organized in a hierarchy of levels, the method comprising:
   joining a peer to-peer network in a host zone of a host peer;
   receiving at least one entry associated with a host muting table of said host peer;
   comparing a zone associated with a current entry of the selected routing table with a target zone, the target zone is chosen as a first zone divided by an expressway span K, wherein the first zone is identified from an entry in the selected routing table that is one routing level above the current entry in the hierarchy of the selected muting table, and the expressway span K is a span between zone representatives of zones in the one routing level immediately above a routing level of the current entry in the hierarchy of the selected routing table;

responsive to the comparing of said zone being smaller or equal to said target zone, moving the current city of the selected routing table down one prior routing level to make room for a new currant entry of the selected routing table;

determining a new zone for the new current entry of the selected routing table; and associating the new current muting entry with the new zone.

7. The method according to claim 6, further comprising: incorporating said zone, neighboring zones to said zone and at least one entry of said host routing table into said routing table.

8. The method according to claim 6, further comprising: entering an idle state in response to said zone being greater than said target zone.

9. The method according to claim 8, further comprising: determining a plurality of neighboring zones of said zone; determining one or more residents in said plurality of neighboring zones;

associating said plurality of neighboring zones and said one or more residents with said entry.

10. A computer readable storage on which is embedded one or more computer programs, said one or more computer programs implementing a method at adding to a selected roaring table and entries in the selected routing table are organized in a hierarchy of levels, said one or more computer programs comprising a set of instructions for:

joining a peer-to-peer network in a host zone of a host peer;

receiving at least one entry associated with a host routing table of said host peer;

comparing a zone associated with a current entry of the selected routing table with a target zone, the target zone is chosen as a first zone divided by an expressway span K, wherein the first zone is identified from an entry in the selected routing table that is one routing level above the current entry in the hierarchy of the selected routing table, and the expressway span K is a span between zone representatives of zones in one routing level prior to a current routing level of the current entry in the hierarchy of the selected routing table;

responsive to the comparing of said zone being smaller or equal to said target zone, moving the current entry of the selected routing table down one prior routing level to make room for a new current entry of the selected routing table;

determining a new zone for the new current entry of the selected Routing table; and associating the new current routing entry with the new zone.

11. The computer readable storage device in according to claim 10, said set of instruction further comprises:

incorporating said zone, neighboring zones to said zone and at least one entry of said host routing table into said muting table.

12. The computer readable storage device in according to claim 10, wherein said target zone being a zone associated with a previous entry to a current entry divided by a span.

13. The computer readable storage device in according to claim 10, said set of instructions further comprises:

entering an idle state in response to said zone being greater than said target zone.

14. The computer readable storage device in according to claim 10, said set at instructions further comprises:

determining a plurality of neighboring zones of said new zone; determining one or more residents in said plurality of neighboring zones;

associating said plurality of neighboring zones and said one or more residents with said entry.

15. A system comprising:

a plurality of peas configured to operate as a peer-to-peer network;

and a plurality of routing modules, each routing module associated with a respective pear of said plurality of peers and configured to implement an expressway overlay network over said peer to-peer network; and a plurality of routing tables, each routing table including entries organized in a hierarchy of levels and each routing table being associated with a respective routing module, wherein each routing module is configured to:

forward a routing table of said respective peer excluding a current curry of the routing table of said respective peer in response to a new peer being added to a zone of said respective peer, the forwarded routing table is a part of a new routing table of said new peer;

compare a current zone of said new peer with a merger zone, fire target zone is chosen as a first zone divided by an expressway span K, wherein the first zone is identified from an entry one routing level below the current entry in the hierarchy of the routing table of said respective peer, and the express way span K is a span between zone representatives of zones in a routing level above a routing level of the current entry in the hierarchy of the routing table of said respective peer;

move a current entry of the new routing table of said new peer down one prior routing level to make room for a new current entry in response to said zone of said selected peer being one of smaller than and equal to said target zone;

determine a new current zone for said new peer; and associate the new current entry with the new current zone for said new peer.

16. A system for generating a routing table in a new peer in a peer-to-peer network, the routing table configured to have entries organized in a hierarchy of level the system comprising:

at least one processor;

a memory coupled to said at least one processor;

a routing table stored in said memory; and a routing module associated with said routing table and configured to be executed by said at least one processor, wherein said routing module is configured to:

compare a current zone of said new peer with a target zone, the target zone is chosen as a first zone divided by an expressway span K, wherein the first zone is identified from an entry one routing level above the current entry in a hierarchy of a routing table of an existing peer, and the expressway span K is a span between zone representatives of zones in the routing level of the entry above a routing level of the current entry in the hierarchy of the routing table of the existing peer;

move a current entry of the new routing table of said new peer down one routing level to make mom for a new current entry in response to said zone of said selected peer being one of smaller than and equal to said target zone;

determine a. new current zone for said new peer; and associate the new current entry with the new current zone for said new peer.

17. The system according to claim 16, wherein said routing module is further configured to remove data associated with the current entry, increment a routing level, said routing level configured to indicate a number of curries in said routing table of said new peer, and to associate said entry with said incremented routing level.

18. The system according to claim 17, wherein said routing module is further configured to determine dimensions of a new zone for said new peer and to associate said new zone with said entry.

19. The system according to claim 18, wherein said routing module is further configured to determine a plurality of neighboring zones of said new zone, to determine one or more residents in said plurality of neighboring zones, and to determine respective addresses of said one or more residents.

20. The system according to claim 19, wherein said routing module is further configured to associate said plurality of neighboring zones, said one or more residents, and said respective addresses of said one or more residents with said entry.

* * * * *

UNITED STATES PATENT AND TRADEMARK OFFICE
CERTIFICATE OF CORRECTION

PATENT NO. : 7,454,520 B2
APPLICATION NO. : 10/299908
DATED : November 18, 2008
INVENTOR(S) : Zheng Zhang et al.

It is certified that error appears in the above-identified patent and that said Letters Patent is hereby corrected as shown below:

In column 9, line 21, delete "RLZ" and insert -- $R_LZ$ --, therefor.

In column 11, line 35, delete "executabic" and insert -- executable --, therefor.

In column 12, line 34, in Claim 1, delete "peer," and insert -- peer; --, therefor.

In column 12, line 35, in Claim 1, after "peer" insert -- ; --.

In column 12, line 44, in Claim 2, delete "at" and insert -- of --, therefor.

In column 12, line 60, in Claim 6, delete "peer to-peer" and insert -- peer-to-peer --, therefor.

In column 12, line 61, in Claim 6, delete "muting" and insert -- routing --, therefor.

In column 13, line 1, in Claim 6, delete "muting" and insert -- routing --, therefor.

In column 13, line 8, in Claim 6, delete "city" and insert -- entry --, therefor.

In column 13, line 9, in Claim 6, delete "currant" and insert -- current --, therefor.

In column 13, line 13, in Claim 6, delete "muting" and insert -- routing --, therefor.

In column 13, line 25, in Claim 9, after "zones;" insert -- and --.

In column 13, line 28, in Claim 10, after "storage" insert -- device --.

In column 13, line 30, in Claim 10, delete "at" and insert -- of --, therefor.

UNITED STATES PATENT AND TRADEMARK OFFICE
CERTIFICATE OF CORRECTION

PATENT NO.        : 7,454,520 B2
APPLICATION NO.   : 10/299908
DATED             : November 18, 2008
INVENTOR(S)       : Zheng Zhang et al.

It is certified that error appears in the above-identified patent and that said Letters Patent is hereby corrected as shown below:

In column 13, line 31, in Claim 10, delete "roaring" and insert -- routing --, therefor.

In column 13, line 53, in Claim 10, delete "Routing" and insert -- routing --, therefor.

In column 13, line 57, in Claim 11, delete "instruction" and insert -- instructions --, therefor.

In column 13, line 60, in Claim 11, delete "muting" and insert -- routing --, therefor.

In column 14, line 2, in Claim 14, delete "at" and insert -- of --, therefor.

In column 14, line 9, in Claim 15, delete "peas" and insert -- peers --, therefor.

In column 14, line 12, in Claim 15, delete "pear" and insert -- peer --, therefor.

In column 14, line 14, in Claim 15, delete "peer to-peer" and insert -- peer-to-peer --, therefor.

In column 14, line 20, in Claim 15, delete "curry" and insert -- entry --, therefor.

In column 14, line 24, in Claim 15, delete "merger" and insert -- target --, therefor.

In column 14, line 25, in Claim 15, delete "fire" and insert -- the --, therefor.

In column 14, line 29, in Claim 15, delete "express way" and insert -- expressway --, therefor.

In column 14, line 44, in Claim 16, delete "level" and insert -- levels, --, therefor.

UNITED STATES PATENT AND TRADEMARK OFFICE
CERTIFICATE OF CORRECTION

PATENT NO.         : 7,454,520 B2
APPLICATION NO.    : 10/299908
DATED              : November 18, 2008
INVENTOR(S)        : Zheng Zhang et al.

It is certified that error appears in the above-identified patent and that said Letters Patent is hereby corrected as shown below:

In column 14, line 64, in Claim 16, delete "mom" and insert -- room --, therefor.

In column 15, line 1, in Claim 16, delete "a." and insert -- a --, therefor.

In column 15, line 7, in Claim 17, delete "curries" and insert -- entries --, therefor.

Signed and Sealed this

Twenty-first Day of April, 2009

JOHN DOLL
*Acting Director of the United States Patent and Trademark Office*